(12) United States Patent
Tsui et al.

(10) Patent No.: US 10,601,456 B2
(45) Date of Patent: *Mar. 24, 2020

(54) FACILITATION OF PASSIVE INTERMODULATION CANCELATION VIA MACHINE LEARNING

(71) Applicant: AT&T Intellectual Property I, L.P., Atlanta, GA (US)

(72) Inventors: Ernest Tsui, Pleasanton, CA (US); Paul Maxwell, Piedmont, CA (US); Weihua Ye, Bartlett, IL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/237,922

(22) Filed: Jan. 2, 2019

(65) Prior Publication Data

US 2019/0158131 A1 May 23, 2019

Related U.S. Application Data

(63) Continuation of application No. 15/640,382, filed on Jun. 30, 2017, now Pat. No. 10,187,098.

(51) Int. Cl.
*H04B 1/10* (2006.01)
*H04B 1/04* (2006.01)
(Continued)

(52) U.S. Cl.
CPC .............. *H04B 1/109* (2013.01); *G06N 20/00* (2019.01); *H04B 1/0466* (2013.01);
(Continued)

(58) Field of Classification Search
CPC ............... H01L 29/778; H01L 29/7781; H01L 29/7783; H04B 7/18515; H04B 7/18582;
(Continued)

(56) References Cited

U.S. PATENT DOCUMENTS

| 5,365,516 A | 11/1994 | Jandrell |
| 6,233,434 B1 | 5/2001 | Takei |

(Continued)

FOREIGN PATENT DOCUMENTS

| CN | 105991157 A | 10/2016 |
| CN | 106301417 A | 1/2017 |

(Continued)

OTHER PUBLICATIONS

U.S. Appl. No. 15/640,382, filed Jun. 30, 2017.

(Continued)

*Primary Examiner* — Shaima Q Aminzay
(74) *Attorney, Agent, or Firm* — Amin, Turocy & Watson ,LLP

(57) ABSTRACT

A passive intermodulation detection system is provided to remotely identify passive intermodulation at a base station site and diagnose the type of intermodulation and location of the non-linearity that is the source of the passive intermodulation. A passive intermodulation cancelation system can generate an equivalent signal to a received interference signal and use the equivalent signal to generate an error signal. The error signal can then be used to reinforce a learning system and converge on a steady state of the interference signal to cancel other interference signals.

20 Claims, 11 Drawing Sheets

(51) Int. Cl.
*H04B 17/11* (2015.01)
*H04B 17/21* (2015.01)
*G06N 20/00* (2019.01)

(52) U.S. Cl.
CPC ........... *H04B 1/0475* (2013.01); *H04B 17/11* (2015.01); *H04B 17/21* (2015.01); *H04B 1/1027* (2013.01)

(58) Field of Classification Search
CPC ...... H04B 1/109; H04B 1/0466; H04B 17/21; H04B 17/11; H04B 1/0475; H04B 1/1027; G06N 20/00
USPC ......................................................... 455/296
See application file for complete search history.

(56) References Cited

U.S. PATENT DOCUMENTS

| | | | |
|---|---|---|---|
| 8,369,812 | B2 | 2/2013 | Lehman |
| 8,666,322 | B1 | 3/2014 | Bradley et al. |
| 8,831,593 | B2 | 9/2014 | Melester et al. |
| 8,855,175 | B2 | 10/2014 | Wyville et al. |
| 8,890,619 | B2 | 11/2014 | Wyville |
| 8,903,324 | B1 | 12/2014 | Bradley |
| 8,983,454 | B2 | 3/2015 | Bevan et al. |
| 9,026,064 | B2 | 5/2015 | Wang et al. |
| 9,391,719 | B2 | 7/2016 | Neidhardt et al. |
| 9,413,417 | B2 | 8/2016 | Fleischer et al. |
| 9,432,173 | B2 | 8/2016 | Mao et al. |
| 9,438,285 | B2 | 9/2016 | Wyville |
| 9,461,697 | B2 | 10/2016 | Yu et al. |
| 9,532,252 | B2 | 12/2016 | Hariharan et al. |
| 9,660,673 | B2 | 5/2017 | Miao et al. |
| 9,699,010 | B2 | 7/2017 | Tobisu et al. |
| 10,187,098 | B1 * | 1/2019 | Tsui ................. H04B 1/109 |
| 2003/0232600 | A1 | 12/2003 | Montgomery et al. |
| 2009/0086864 | A1 | 4/2009 | Komninakis |
| 2009/0125253 | A1 | 5/2009 | Blair et al. |
| 2012/0295558 | A1 | 11/2012 | Wang et al. |
| 2013/0044791 | A1 | 2/2013 | Rimini et al. |
| 2013/0054169 | A1 | 2/2013 | Neidhardt et al. |
| 2013/0310023 | A1 | 11/2013 | Bevan et al. |
| 2013/0322395 | A1 | 12/2013 | Kazmi et al. |
| 2014/0119197 | A1 | 5/2014 | Maca et al. |
| 2014/0153418 | A1 | 6/2014 | Hariharan et al. |
| 2014/0161005 | A1 | 6/2014 | Laurent-Michel |
| 2014/0242930 | A1 | 8/2014 | Barker et al. |
| 2014/0294052 | A1 | 10/2014 | Currivan et al. |
| 2014/0378067 | A1 | 12/2014 | Au |
| 2015/0087242 | A1 | 3/2015 | Bain et al. |
| 2015/0145528 | A1 | 5/2015 | Yeo et al. |
| 2015/0222371 | A1 | 8/2015 | Afkhami et al. |
| 2015/0244414 | A1 | 8/2015 | Yu et al. |
| 2015/0249965 | A1 | 9/2015 | Dussmann et al. |
| 2015/0318882 | A1 | 11/2015 | Wyville |
| 2015/0350940 | A1 | 12/2015 | Wilson et al. |
| 2015/0358144 | A1 | 12/2015 | Fleischer et al. |
| 2016/0006468 | A1 | 1/2016 | Gale et al. |
| 2016/0028497 | A1 | 1/2016 | Holt et al. |
| 2016/0072591 | A1 | 3/2016 | Tu et al. |
| 2016/0142229 | A1 | 5/2016 | Bevan et al. |
| 2016/0322995 | A1 | 11/2016 | Bevan et al. |
| 2016/0366605 | A1 | 12/2016 | Tsui et al. |
| 2017/0064591 | A1 | 3/2017 | Padfield et al. |

FOREIGN PATENT DOCUMENTS

| | | |
|---|---|---|
| CN | 106330219 A | 1/2017 |
| EP | 2 104 266 A2 | 9/2009 |
| EP | 3 176 951 A1 | 6/2017 |
| WO | 2014/085345 A1 | 6/2014 |
| WO | 2014/166229 A1 | 10/2014 |
| WO | 2016/059424 A1 | 4/2016 |
| WO | 2017/072552 A1 | 5/2017 |
| WO | 2017/091468 A1 | 6/2017 |

OTHER PUBLICATIONS

L. Tarlazzi, "PIM Requirements Must Increase to Support Evolving DAS Systems", Commscope, Aug. 2014, 16 pgs.
N. Cannon, "Troubleshooting Passive Intermodulation Problems in the Field", Anritsu America, http://www.anritsu.com/enUS/ProductsSolutions/Solution/Troubleshootingpassiveintermodulation.aspx, last accessed Mar. 19, 2015, 4 pgs.
Non-Final Office Action received for U.S. Appl. No. 14/734,766 dated Jan. 26, 2017, 58 pages.
Wilkerson et al., "Passive Intermodulation Distortion in Antennas," IEEE Transactions on Antennas and Propagation, Feb. 2015, vol. 63, No. 2, pp. 474-482.
Yang et al., "PIM Interference Testing Methods of Satellite Communication Components and Setting up of the Testing System," General Assembly and Scientific Symposium (URSI GASS), 2014, IEEE, 4 pages.
Non-Final Office Action received for U.S. Appl. No. 15/179,427 dated Jan. 26, 2017, 16 pages.
Non-Final Office Action received for U.S. Appl. No. 14/734,766 dated Jun. 23, 2017, 39 pages.
Notice of Allowance dated May 22, 2017 for U.S. Appl. No. 15/179,427, 24 pages.
Tian et al., "Adaptive Suppression of Passive Intermodulation in Digital Satellite Transceivers," Chinese Journal of Aeronautics, 2017, pp. 1154-1160, Vo. 30, No. 3, Elsevier, 7 pages.
Caratelli et al., "Electromagnetic Characterization of Non Linear Surfaces Using Impedance Boundary Conditions," Proceedings of the 5th European Conference on Antennas and Propagation (EUCAP), May 2011, IEEE, 7 pages.
Kozlov et al., "Passive Intermodulation of Analog and Digital Signals on Transmission Lines With Distributed Nonlinearities: Modelling and Characterization," IEEE Transactions on Microwave Theory and Techniques, 2016, vol. 34, No. 5, 3 pages.
Final Office Action received for U.S. Appl. No. 14/734,766 dated Oct. 25, 2017, 45 pages.
Non-Final Office Action received for U.S. Appl. No. 15/640,382 dated Apr. 6, 2018, 26 pages.

* cited by examiner

FACILITATION OF PASSIVE INTERMODULATION CANCELATION VIA MACHINE LEARNING

RELATED APPLICATION

The subject patent application is a continuation of, and claims priority to, U.S. patent application Ser. No. 15/640,382, filed Jun. 30, 2017, and entitled "FACILITATION OF PASSIVE INTERMODULATION CANCELATION VIA MACHINE LEARNING," the entirety of which application is hereby incorporated by reference herein.

TECHNICAL FIELD

This disclosure relates generally to facilitating the cancelation of passive intermodulation for antennas. More specifically, this disclosure relates to cancelation of passive intermodulation using machine learning.

BACKGROUND

Intermodulation is the amplitude modulation of signals containing two or more different frequencies in a system with non-linearities that results in signal noise. The intermodulation between each frequency component can form additional signals at frequencies that are harmonic frequencies and sum and difference frequencies of the original frequencies and multiples thereof. The non-linearities can be caused by junctions in the physical equipment (cables, antennas), as well as by sources in the surrounding environment. This type of intermodulation, caused by non-active components, is called external (in the sense the passive intermodulation sources are external to the cabling/antenna system) passive intermodulation and can be difficult and costly to diagnose as site visits by skilled technicians are traditionally used to detect and identify the non-linearity source locations.

The above-described background relating to intermodulation is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
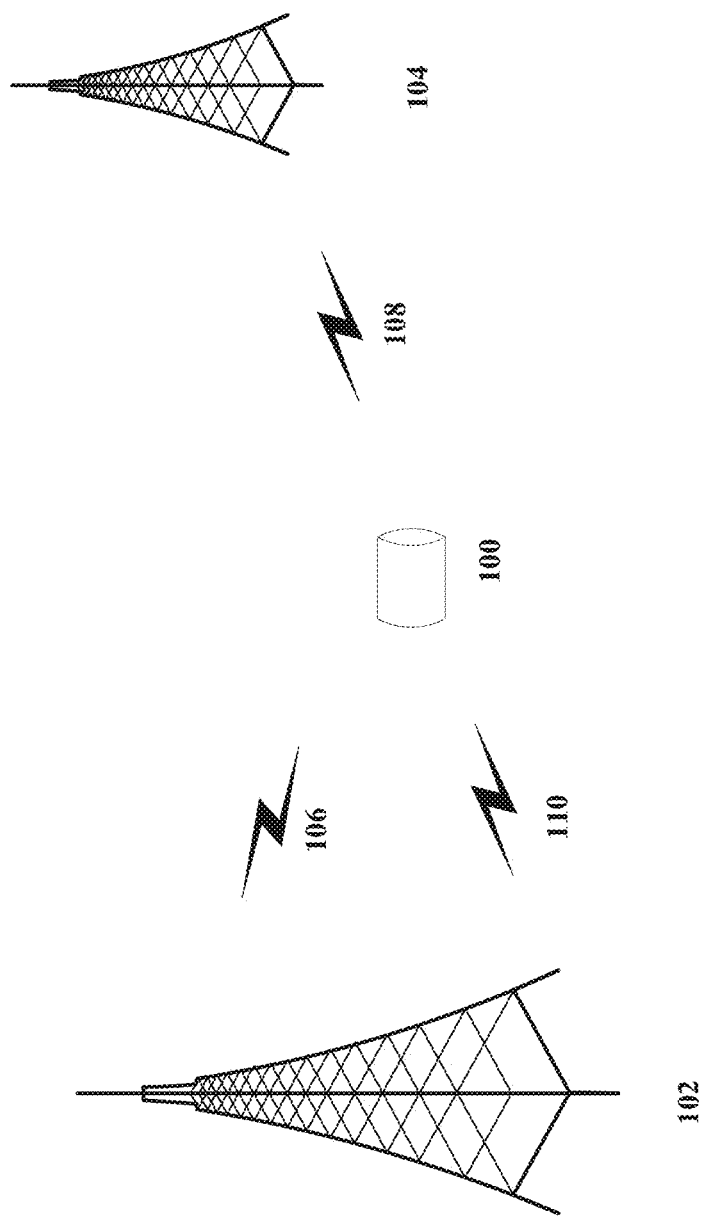
FIG. 1 illustrates an example wireless network comprising passive intermodulation cancelation according to one or more embodiments.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, computer-readable carrier, or computer-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate passive intermodulation cancelation between network devices.

For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It is noted that although various aspects and embodiments are discussed herein with respect to Universal Mobile Telecommunications System (UMTS) and/or Long Term Evolution (LTE), the disclosed aspects are not limited to a UMTS implementation and/or an LTE implementation. For example, aspects or features of the disclosed embodiments can be exploited in substantially any wireless communication technology. Such wireless communication technologies can include 5G, UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate passive intermodulation cancelation. A passive intermodulation detection system can remotely identify passive intermodulation at a base station site and diagnose the type of intermodulation and location of the non-linearity that is the source of the passive intermodulation. Additionally, the passive intermodulation detection system can identify wireless carriers associated with the passive intermodulation. The passive intermodulation detection system can detect a first transmission signal in a first band that is transmitted by an antenna. Another antenna or the same antenna can receive the first transmission signal in another band, and the passive intermodulation detection system can analyze the received signal to determine whether an intermodulation product due to an external or internal non-linearity is present. Based on the type of intermodulation product, period, order, frequency, etc., the type (internal or external or both), magnitude, and location of the non-linearity can be identified. The passive intermodulation detection system can also distinguish passive intermodulation noise from adjacent channel interference.

Once the characteristics of the passive intermodulation are discovered and analyzed, this information can then be used to effectively cancel the effect of the nonlinearities by use of the known characteristics of the received transmission signals and the estimated characteristics of the nonlinearity sources. A cloud based machine learning approach can be used to learn, model, and cancel passive intermodulation via software that can be downloaded from an open network automation process (ONAP) to a software-defined network (SDN) and/or a network function virtualization (NFV). Furthermore, the machine learning can be based on non-parametric learning, requiring limited or no a-priori knowledge of the environment and PIM source specifics. The use of machine learning can allow the passive intermodulation cancelation system to adapt so various use cases involving various carriers with various transmission and reception port signals, which may be susceptible to varying levels of interference. Because various carriers can have varying levels of passive intermodulation, it is important to identify the strongest passive intermodulation and cancel it. The use of machine learning techniques can learn in near real time implement cancelation in a flexible architecture to deal with different types of passive intermodulation. The learning solution can also be extended to include antenna beamforming techniques to jointly cancel and reject external passive intermodulation signals.

A network core with an SDN controller can control routing of traffic within the network and cancelation of passive intermodulation signals between the network and the traffic destination. The SDN controller can be merged with existing $3^{rd}$ Generation Partnership Project ("3GPP") network architecture to enable service deliveries via open application programming interfaces ("APIs") and move the network core towards an all internet protocol ("IP"), cloud based, and software driven telecom network. The SDN controller can work with, or take the place of policy and charging rules function ("PCRF") network elements so that policies such as quality of service ("QoS") and traffic management and routing can be synchronized and managed end to end.

An LTE network is a policy-based traffic management architecture with a PCRF element traditionally controlling the QoS levels and other information (priorities bandwidths, etc.) that manages IP flows that carries a particular application (such as voice, video, messaging, etc.). This policy-based mechanism applies to the IP traffic between the mobile device and the packet data network gateway ("PGW"). In an embodiment of the subject disclosure, software defined networking can be used to cancel passive intermodulation signals from transceiver ports to receiver ports. In some embodiments, the SDN controller can also provide traffic control for packets from the mobile device to the destination based on a severity of the severity of the signal interference.

To cancel a reflected signal, the non-linearity, the multi-path to the passive intermodulation (PIM) source, the reflected signal multipath, and the reception filtering can be modeled with machine learning techniques. A downlink from two different bands can transmit two polarizations each (F1 at +/−45°) and (F2 at +/−45°), which can generate four products. Each product can be analyzed separately to determine which product dominates in order to simplify the cancelation and the conversion from a non-linear system into a linear system. When there is a single band, the analysis can determine an internal PIM, but the analysis can also determine an external PIM for the single band by isolating the band to determine if there is any intermodulation on the band. Respectively, a dual antenna system with adequate isolation can determine intermodulation for two bands.

Generally, a third order product from a PIM non-linearity is the strongest. Therefore, canceling the third order product can be the priority. However, it should be noted that any other order could potentially be stronger than the third order product. Therefore, any other order can be selected for cancelation. The products can comprise transmission signals and complex amplitude and phase adjustments, wherein the transmissions ports can generate multiple frequency bands. For example, a PIM source can be modeled to the third order and give the following in-band products for a band 17 uplink:

$$(Ka \times 29H)^3 + (Kd \times 29V)^3 + [(Kc \times 29H) \times (Kd \times 29V)]^3 +$$
$$[(Ka \times 17H)(Kc \times 29H)]^2 + (Ka \times 17V) \times (Kd \times 29V)^2 +$$
$$(Ka \times 17H) \times (Kd \times 29V)^2 + (Kb \times 17V) \times (Kc \times 29H)^2$$

Eqn (1)

The band 17 self-products can be ignored since they are far away in frequency (but for completeness, they can appear exactly like the band 29 above except 29 is replaced by 17).

The PIM can be modeled to determine the largest intermodulation that impacts the band 17 uplink by placing the third order intermodulation products into the desired signal. The average magnitude of the third order intermodulation product components can be calculated and ranked based on the signal plus interference noise ratio/physical resource block bandwidth. Thereafter, the two highest values can be input into the canceler system. However, it should be noted that one PIM or several PIMs can be canceled simultaneously.

Due to the enormity and complexity of the unknowns associated with passive intermodulation, it is difficult to use a parameterized model of the known transmission signals (through propagation and polarization rotation) to construct a reception model of the intermodulation signals, which can be used to cancel the received intermodulation interference signals. Therefore, a non-parametric learning model can identify the various transmission signals that cause significant interference and use them to cancel the received intermodulation interference.

Passive intermodulation identification techniques can be used to identify interference signals that are interference with received transmission. These identification techniques can identify carriers and respective antenna ports that contribute to the passive intermodulation at each reception port. As noted above, there are products associated with each of the signals experiencing the transmission interference. The products can be ranked, by order of the severity of the signal interference, to determine which signal interference should be canceled first. Once the signal experiencing the greatest interference is determined via the ranking of its products, a conforming signal can be generated by the system. It should be noted that the conforming signal can be equivalent to, match, be a duplicate of, and/or be similar to the signal experiencing the greatest interference. Additionally, it should be noted that carriers and/or antenna ports can be loaded at 100% utilization of their respective physical resource blocks. The passive intermodulation cancelation system can then generate a transmission/reception channel that can be used to estimate the received intermodulation interference based on another transmission signal. The estimated signal can then be subtracted from the received signal to yield an error signal. The error signal can then be used as an output to cancel future passive intermodulation signals.

The error output can be placed through the machine learning process to converge on a steady state of the interfering signal. The cancelation system can also account for any time delay due to propagation variance associated with time. In conjunction with the machine learning and cancelation system, the model can also comprise a pre-filter to model the known properties of any uplink filter to avoid additional adaptive filter steps associated with a learning filter that can increase complexity and slow convergence. The pre-filter can also model the reception antenna and filter. Additionally, the machine learning techniques can be implemented as a cloud-based radio access network software module controlled by the ONAP, which can route any transmission port signal(s) to the passive intermodulation cancelation system for a give reception port(s).

To achieve a minimum cancelation objective with the lowest complexity configuration, the passive intermodulation cancelation system can perform these operations during a maintenance window. The maintenance window is a period of reduced or low wireless network usage (e.g., after midnight) that takes a network element out of service or partially out of service, where the network element can be altered. The maintenance window can also be determined based on maintenance windows of other neighboring sites. For example, a good maintenance window for one site can be when the there are no maintenance windows for its neighboring sites so that the neighboring sites can pick up the additional network load. Consequently, the maintenance window can be used to train the passive intermodulation cancelation system. The data developed during the training, can then be used in real-time live period, outside of the maintenance window, to achieve passive intermodulation cancelation in real-time.

In one embodiment, described herein is a method comprising identifying, by a network device, comprising a processor, of a wireless network, a transmission port associated with a signal interference of a reception port, and determining, by network device, an interference product associated with the signal interference. Based on the determining the method can rank, by the network device, the interference product according to a magnitude of the signal interference, resulting in a first ranked interference signal. Consequently, based on a condition associated with the first ranked interference signal being determined to have been satisfied, the method can comprise generating, by the network device, a second ranked interference signal that conforms to the first ranked interference signal.

For these considerations as well as other considerations, in one or more embodiments, a system comprises a processor and a memory that stores executable instructions that when executed by the processor, facilitate performance of operations, comprising determining a first signal interference associated with a first signal received by a receiver device, and determining an interference product as a function of the first signal interference. Based on the interference product, the operations can comprise generating rank data representative of a rank of the first signal interference, and applying the rank data to the first signal interference to generate a ranked interference signal. Furthermore, based on the rank data, the operations can comprise generating a second signal interference, and utilizing a channel associated with a transmitter device and the receiver device to facilitate modification of a second signal to be sent from the transmission device to the receiver device.

According to yet another embodiment, described herein is a machine-readable storage medium that can perform the operations comprising receiving first signal data related to a transmission signal from a transmission port device to a reception port device, wherein a signal interference associated with the transmission signal is determined to be present at the reception port device. Based on determining an interference product associated with the signal interference, the operations can comprise ranking the interference product, and base on a result of ranking the signal interference in accordance with the ranking of the interference product, generating a ranked interference signal.

These and other embodiments or implementations are described in more detail below with reference to the drawings.

Referring now to FIG. 1, illustrated is an example wireless network comprising passive intermodulation cancelation according to one or more embodiments. A passive intermodulation source 100 can reflect transmission signals 106, 108 from reception antennas 102, 104. For example, reflected transmission signal 110 can be reflected to the antenna 102 in response to the passive intermodulation cancelation source receiving the transmission signals 106, 108. Additionally, it should be noted that various bands can be associated with the transmission signals 106, 108. For example, the reception antenna 102 can be associated with band 17 thereby associating band 17 with the transmission signal 106, and the reception antenna 104 can be associated with band 29 thereby associating band 29 with the transmission signal 108. To cancel the reflected transmission signal 110, the non-linearity of the passive intermodulation source 100, the transmission signals 106, 108 and reception signals, can be modeled with an adaptive passive intermodulation cancelation module. Additionally, in an alternate embodiment, the transmission signals 106, 108 and reception signals can be external to the passive intermodulation cancelation module.

Figure 2:
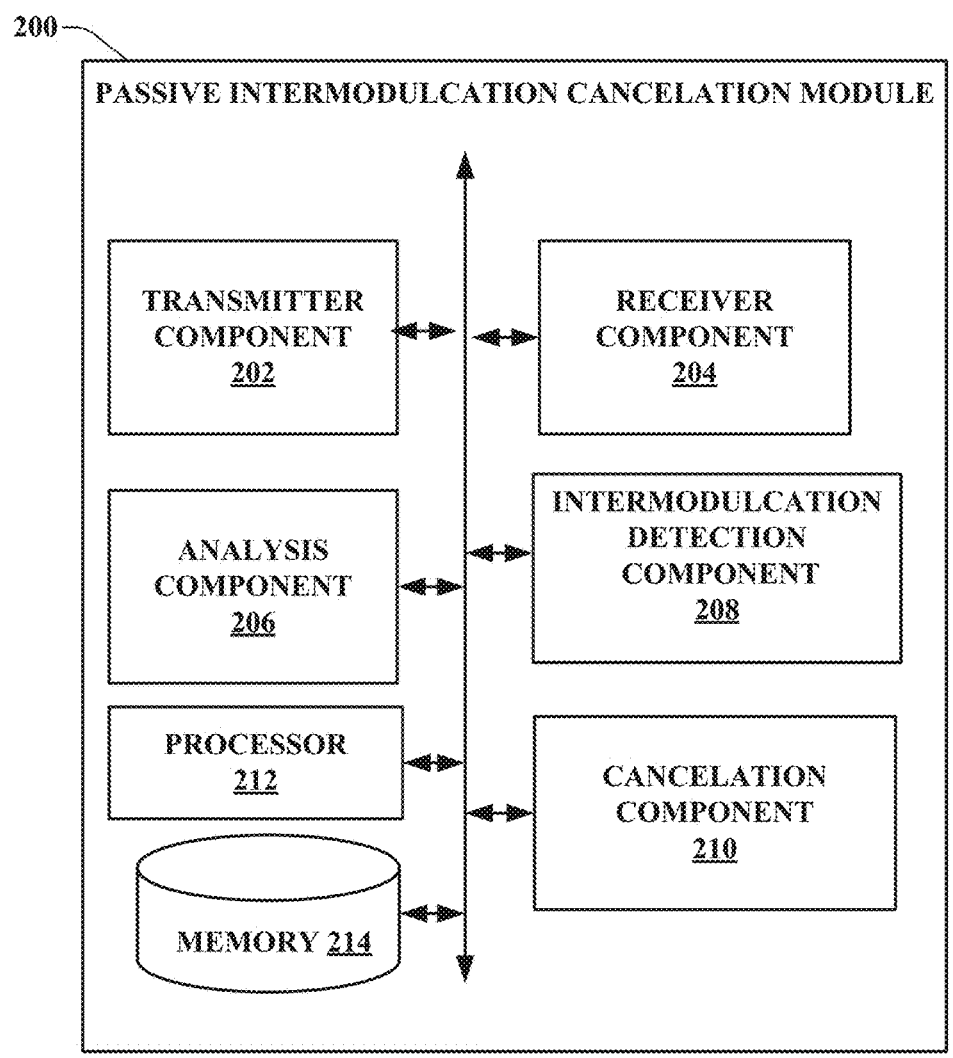
FIG. 2 illustrates an example passive intermodulation cancelation module according to one or more embodiments.

Referring now to FIG. 2, illustrated is an example passive intermodulation cancelation module according to one or more embodiments. Repetitive description of like elements employed in other embodiments described herein is omitted for sake of brevity.

A base station site (e.g., a cell tower or other location where a base station device can be located) can include one or more remote radio heads (RRH) that can send transmissions to one or more mobile devices that are located within range of the base station site. Non-linearities in passive elements (e.g., antennas, cabling, junctions between materials, etc) can cause passive intermodulation when two or more high power tones mix at the nonlinearities (e.g., junctions of dissimilar metals, rust, and even loose connectors). In the embodiment shown in FIG. 2, the passive intermodulation cancelation module 200 can comprise a transmitter component 202 that can transmit wireless data to a receiver component 204. The passive intermodulation cancelation module 200 can also comprise an analysis component 206, an intermodulation detection component 208, and a cancelation component 210. It should be noted that any of the aforementioned components or their sub-components, processor 212, and memory 314 can bi-directionally communicate with each other. It should also be noted that in alternative embodiments that other components including, but not limited to the sub-components, processor 212, and/or memory 314, can be external to the passive intermodulation cancelation module 200, as shown in FIG. 2.

The passive intermodulation cancelation module 200 can be configured to detect passive intermodulation caused by nonlinearities at or external to a cell site. The transmitter component 202 can transmit a signal via an antenna. Such transmissions can comprise a plurality of frequencies during normal operations. For instance, the transmission signal can be in a first band. The receiver component 204 can receive, via another antenna, the transmission in a second band. For instance, the signal can be in a downlink band when transmitted, while signals received by the receiver component 204 can be from a mobile device in an uplink band.

The intermodulation detection component 208 can detect whether the signal, as received by the receiver component 204 includes any intermodulation products from passive intermodulation. In an embodiment, the intermodulation detection component 208 can determine that an intermodulation product from the transmission signal is present in the transmission. The intermodulation detection component 208 can also distinguish the intermodulation product from adjacent channel interference associated with a signal on an adjacent channel based on the slope of the noise amplitude as a function of frequency. The further the frequency is from the adjacent band, the more the noise amplitude decreases. By contrast, the intermodulation product from the passive intermodulation has harmonics that show up as increases at regular frequency intervals. Additionally, the intermodulation detection component 208 can identify the carriers associated with antennas that contribute to the intermodulation interference.

The analysis component 206 can determine a type of a source of non-linearity based on an amplitude and a period of the intermodulation product. This can also determine characteristics of the nonlinearity for use in possible cancelation. The analysis component 206 can also determine a location of the source of non-linearity based on a time delay between the intermodulation product and the transmission signal. Furthermore, the analysis component 206 can also rank intermodulation products (based on a severity of the interference) created by the non-linearity that is predictive of intermodulation products in different contexts (band, frequency, amplitude, etc.). Once the analysis component 206 has ranked the interference products, the analysis component 206 can send data to the cancelation component 210 to generate another signal to match the signal associated with the highest ranked interference product. The other signal can then be used by the cancelation component 210 to modify or otherwise process transmissions to mitigate the intermodulation product on transmissions received by receiver component 204.

The intermodulation detection component 208 and the analysis component 206 can send their outputs to the cancelation component 210 to cancel reflected signals. The cancelation component 210 can account for interference associated with a signal that might have been delayed by hitting an object (i.e. a bolt). However, the interference could also have a frequency and/or a time offset. Additionally, the cancelation component 210 can generate a transmission reception channel that can transform additional transmission signals to an estimated interference signal received by the receiver component 204. The estimated interference can then be subtracted from the interference signal (associated with the highest ranked interference product) to produce an error signal. Therefore an error output, based on the error signal, can be used to adaptively modify future estimates to account for time delay.

Aspects of the processor 212 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described by the passive intermodulation cancelation module 200. In an aspect, the passive intermodulation cancelation module 200 can also include memory 214 that stores computer executable components and instructions.

Figure 3:
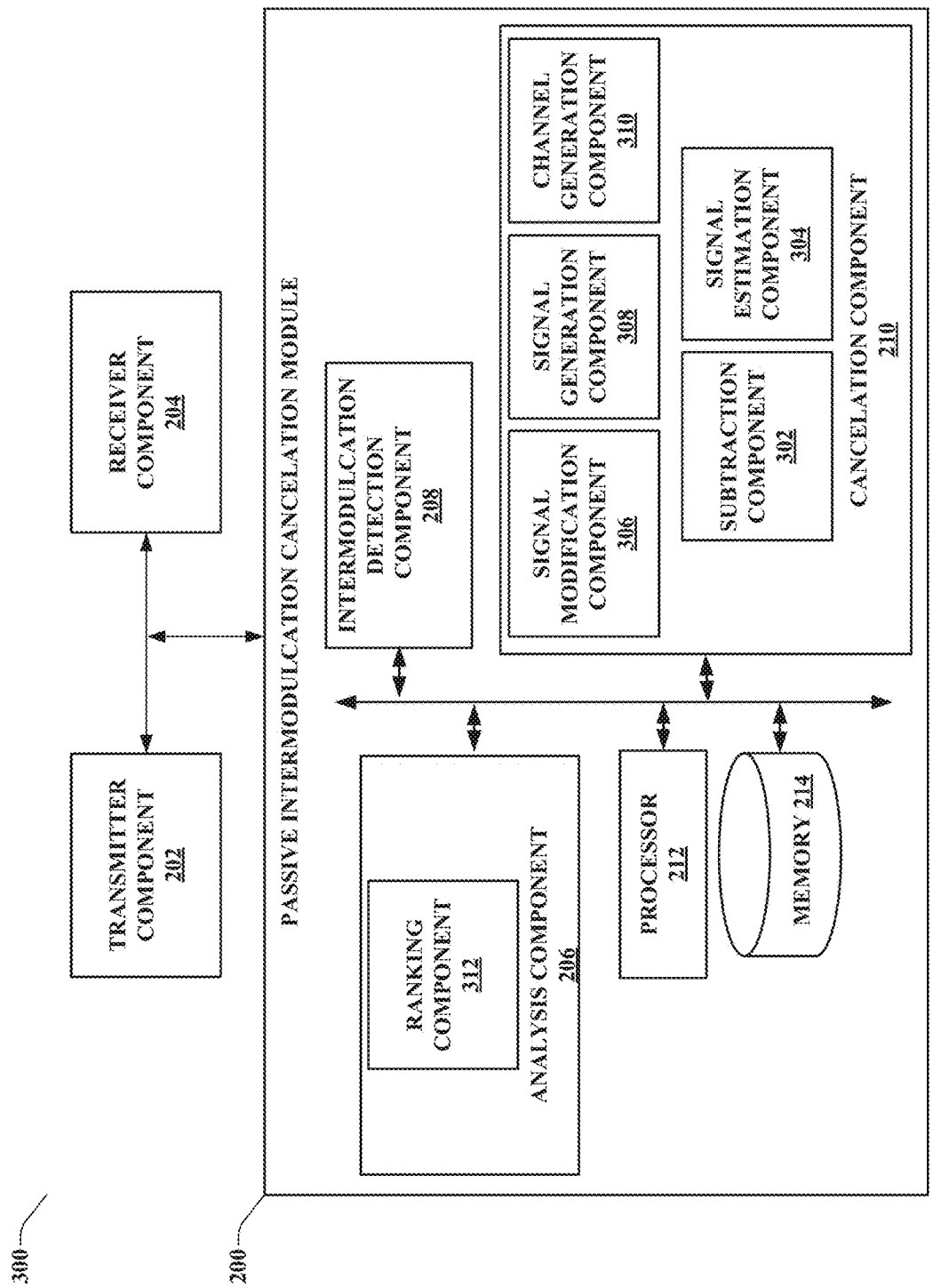
FIG. 3 illustrates an example passive intermodulation cancelation module, wherein the transmitter and receive are external to the module according to one or more embodiments.

Referring now to FIG. 3, illustrated is an example passive intermodulation cancelation module system 300, wherein the transmitter and receiver are external to the module according to one or more embodiments. A passive intermodulation cancelation module 200 can comprise an analysis component 206, an intermodulation detection component 208, and a cancelation component 210. In this particular embodiment, the transmitter component 202 and the receiver component 204 can be external to the passive intermodulation cancelation component 200. However, it should be noted that in alternate embodiments, the transmitter component 202 and the receiver component 204 can be internal to the intermodulation cancelation component 200, as shown in FIG. 2. It should be noted that any of the aforementioned components or their sub-components (e.g., subtraction component 302, signal estimation component 304, signal modification component 306, signal generation component 308, and channel generation component 310), processor 212, and memory 314 can bi-directionally communicate with each other. It should also be noted that in alternative embodiments that other components including, but not limited to the sub-components, processor 212, and/or memory 314, can be external to the passive intermodulation component 200.

The passive intermodulation cancelation component 200 can receive data associated with a transmission signal from an antenna of the transmitter component 202 to an antenna of the receiver component 204. The transmission signal can be in a downlink band, while the signal received by the receiver component 204 can be in an uplink band.

A base station site (e.g., a cell tower or other location where a base station device can be located) can include one or more RRH that can send transmissions to one or more mobile devices that are located within range of the base station site. Non-linearities in passive elements (e.g., antennas, cabling, junctions between materials, etc) can cause passive intermodulation when two or more high power tones mix at the nonlinearities (e.g., junctions of dissimilar metals, rust, and even loose connectors). Therefore, the passive intermodulation cancelation component 200 can be used to cancel the nonlinearities associated with such intermodulation.

The intermodulation detection component 208 can detect whether the signal, as received by the receiver component 204, includes any intermodulation products from passive intermodulation. The intermodulation detection component 208 can determine that an intermodulation product from the transmission signal is present in the transmission. The intermodulation detection component 208 can also distinguish the intermodulation product from adjacent channel interference associated with a signal on an adjacent channel based on the slope of the noise amplitude as a function of frequency. The further the frequency is from the adjacent band, the more the noise amplitude decreases. By contrast, the intermodulation product from the passive intermodulation has harmonics that show up as increases at regular frequency intervals. Additionally, the intermodulation detection component 208 can identify the carriers associated with antennas that contribute to the intermodulation interference.

The analysis component 206 can comprise the ranking component 312. The analysis component 206 can determine a type of a source of non-linearity based on an amplitude and a period of the intermodulation product. This can also determine characteristics of the nonlinearity for use in possible cancelation. The analysis component 206 can also determine a location of the source of non-linearity based on a time delay between the intermodulation product and the transmission signal. Furthermore, the analysis component 206 can rank, via the ranking component 312, intermodulation products (based on a severity of the interference) created by the non-linearity that is predictive of intermodulation products in different contexts (band, frequency, amplitude, etc).

Once the analysis component 206 has ranked the interference products, the analysis component 206 can send rank data to the cancelation component 210 to generate another signal (e.g., via the signal generation component 308) to match the signal associated with the highest ranked interference product. The other signal can then be used by the cancelation component 210 to modify (e.g., via the signal modification component 306) or otherwise process transmissions to mitigate the intermodulation product on transmissions received by receiver component 204.

The intermodulation detection component 208 and the analysis component 206 can send their outputs to the cancelation component 210 to cancel reflected signals. The cancelation component 210 can account for interference associated with a signal that might have been delayed by hitting an object (i.e. a bolt). However, the interference could also have a frequency and/or a time offset. Additionally, the cancelation component 210 can generate a transmission reception channel (e.g., via the channel generation component 310) that can transform additional transmission signals to an estimated interference signal (e.g., via the signal estimation component 304) received by the receiver component 204. The estimated interference can then be subtracted (e.g., via the subtraction component 302) from the interference signal (associated with the highest ranked interference product) to produce an error signal. Therefore an error output, based on the error signal, can be used to adaptively modify future estimates to account for time delay of signals.

Aspects of the processor 212 can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described by the passive intermodulation cancelation module 200. In an aspect, the passive intermodulation cancelation module 200 can also include memory 214 that stores computer executable components and instructions.

Figure 4:
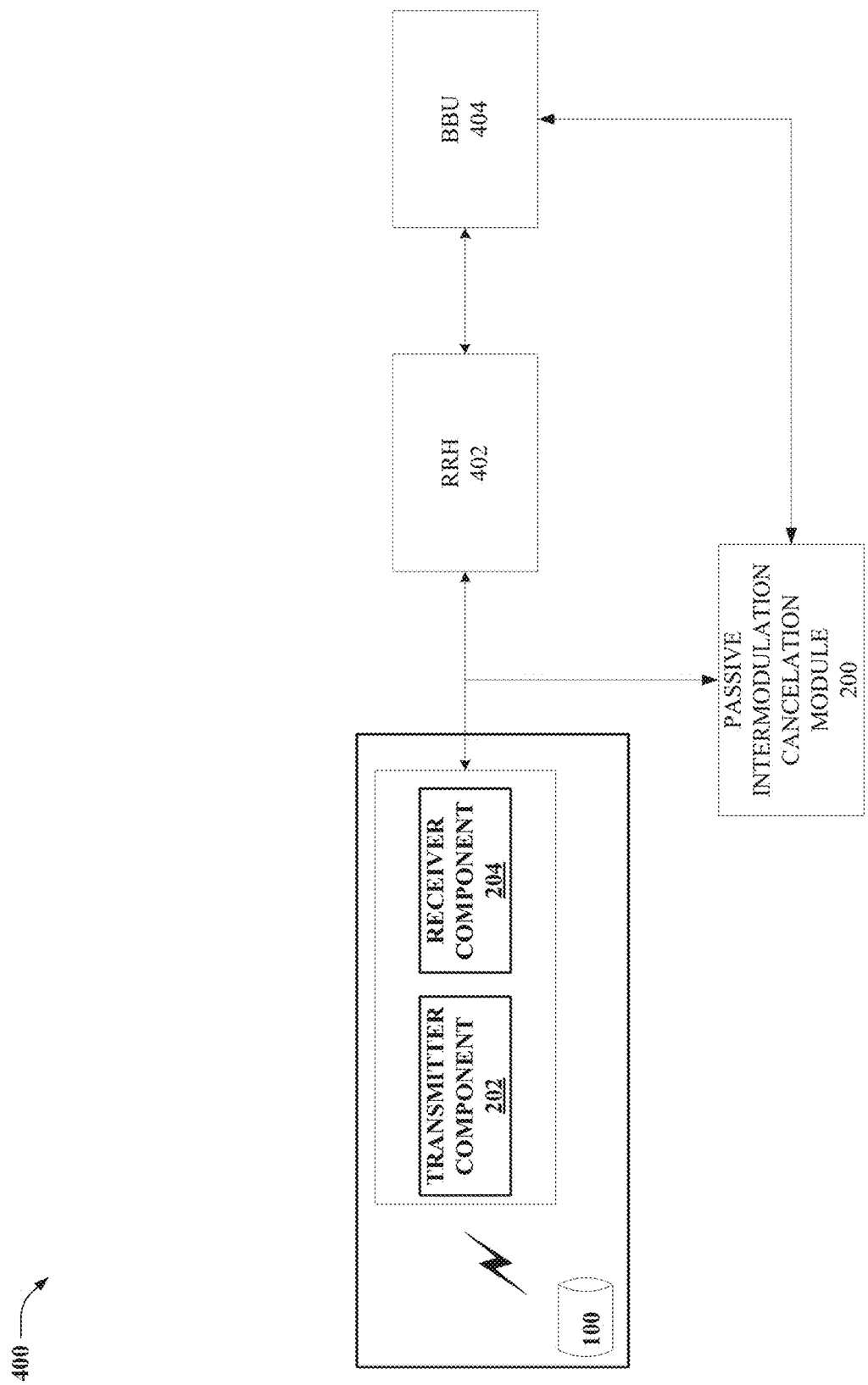
FIG. 4 illustrates an example schematic system block diagram for a system to perform passive intermodulation cancelation according to one or more embodiments

Referring now to FIG. 4, illustrated is an example schematic system block diagram for a system to perform passive intermodulation cancelation according to one or more embodiments. In another embodiment, the transmitter component 202 can transmit a transmission signal to the receiver component 204. However, the transmission signal can experience signal interference from the passive intermodulation source 100. The transmission signal and the signal interference can be received by the RRH 402. The RRH 402 can perform a bidirectional translation of the transmission and receive radio frequencies in the form of digital baseband signals. However, the transmission signal and the signal interference can also be received by the passive intermodulation cancelation module 200.

The passive intermodulation cancelation module 200 can determine that an intermodulation product from the transmission signal is present in the transmission. Additionally, the intermodulation detection component 208 can identify the carriers associated with antennas that contribute to the intermodulation interference. Furthermore, the passive intermodulation cancelation module 200 can also rank (e.g., via the analysis component 206) intermodulation products (based on a severity of the interference) created by the non-linearity that is predictive of intermodulation products in different contexts (band, frequency, amplitude, etc). Another signal can be generated (e.g., via the signal generation component 308) to modify or otherwise process transmissions to mitigate the intermodulation product on transmissions received by receiver component 204.

The passive intermodulation cancelation component 200 can also generate a transmission reception channel (e.g., via the channel generation component 310) that can transform additional transmission signals to an estimated interference signal received by the receiver component 204. The estimated interference can then be subtracted (e.g., via the subtraction component 302 at the BBU 404) from the interference signal (associated with the highest ranked interference product) to produce an error signal. The passive intermodulation cancelation module 200 can send cancelation signals to the BBU 404 to process the cancelation signals along with the baseband. The BBU 404 can subsequently communicate back to the cancelation module 200 the resultant error signal, or the error signal can be computed by the cancelation module 200 if it has knowledge of the baseband received signal from the RRH 402. Either linkage can be represented by the bidirectional arrow between the BBU 404 and the cancelation module 200. Therefore an error output, based on the error signal, can be used to adaptively modify future estimates to account for time delay.

Figure 5:
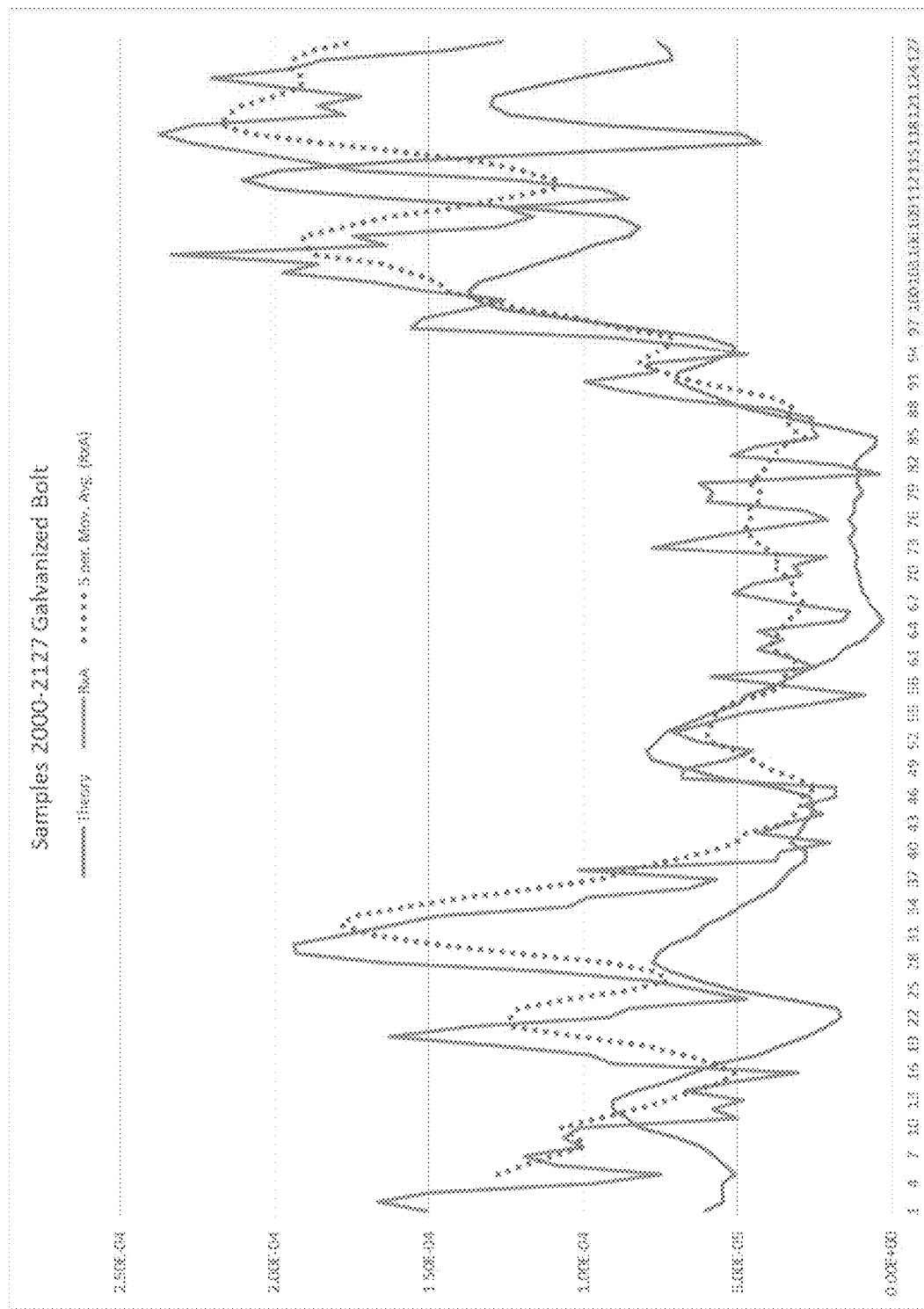
FIG. 5 illustrates an example graph for a passive intermodulation cancelation, wherein a galvanized bolt is the passive intermodulation source.
Figure 6:
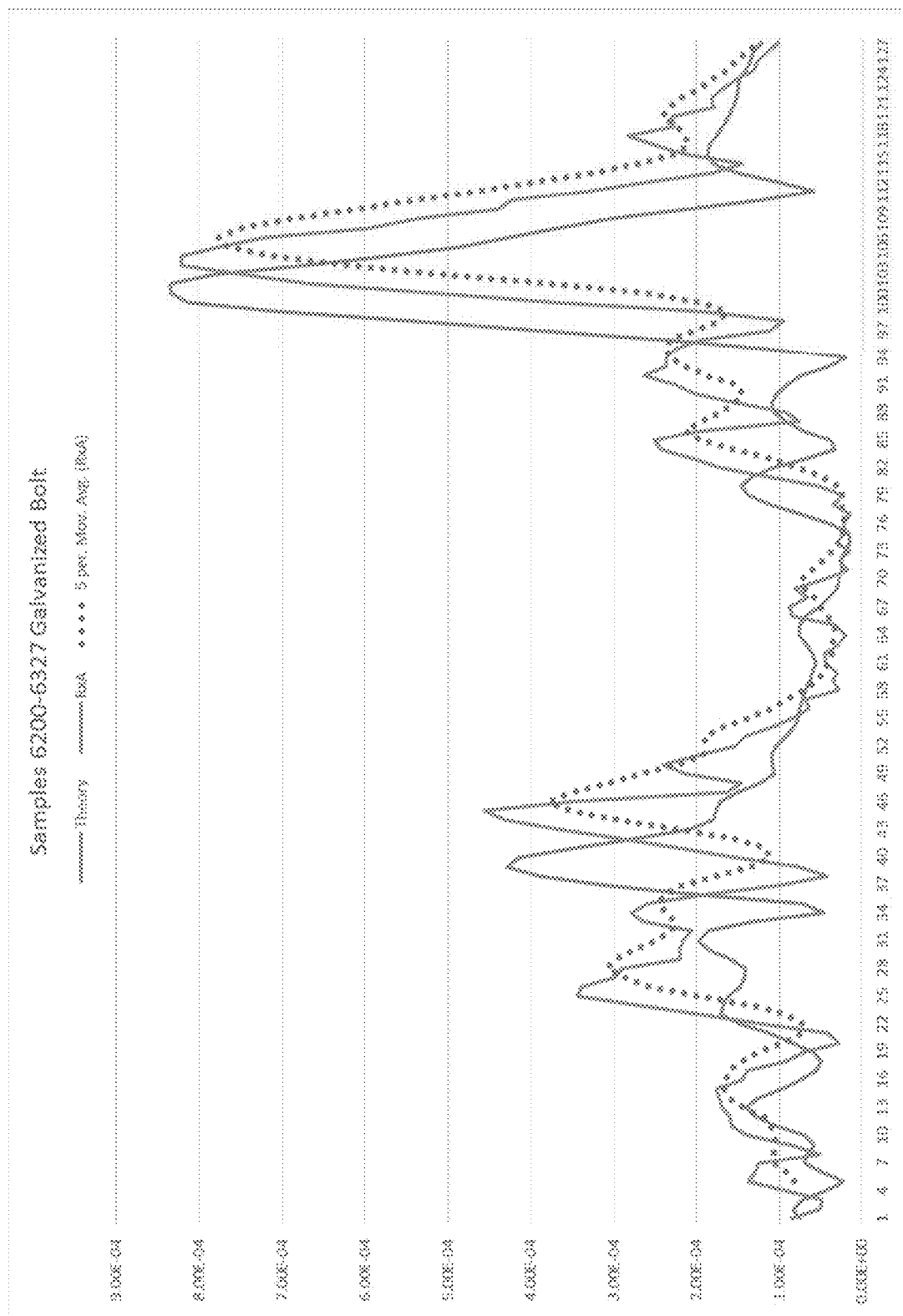
FIG. 6 illustrates an example graph for a passive intermodulation cancelation, wherein a galvanized bolt is the passive intermodulation source.
Figure 7:
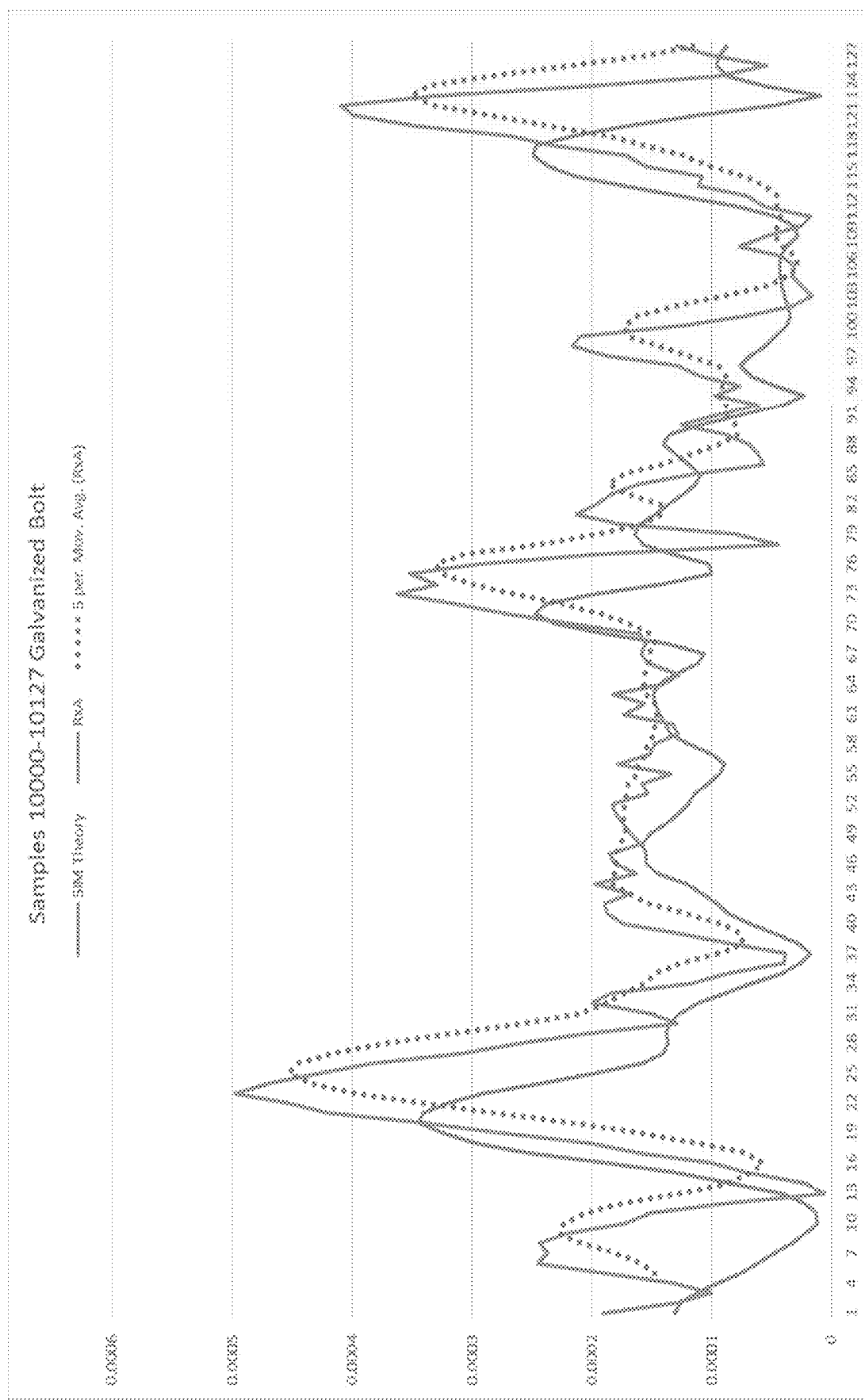
FIG. 7 illustrates an example graph for a passive intermodulation cancelation, wherein a galvanized bolt is the passive intermodulation source.

Referring now to FIGS. 5-8, illustrated are example graphs for a passive intermodulation cancelation, wherein a galvanized bolt is the passive intermodulation source. FIGS. 5-7 depict how a simulated theory versus actual passive intermodulation data compares to a moving average. These graphs illustrate how the instantaneous amplitude of the measured PIM (RxA) compares with a theoretical model based on a time-invariant 3rd-order intermodulation resultant (Theory), and a 5-point moving-average of the measured data (dotted curve). Amplitude is a linear scale with an arbitrary reference level set appropriate for the analog-to-digital converter dynamic range. The X-axis is linear time, roughly 30 ns per sample point. Here, a piece of hardware made of galvanized steel was used as the PIM source.

It should be noted that although the relative amplitude of the theoretical curve versus measured PIM is shown, the ultimate action of the adaptive filter is to dynamically adjust the gain and phase to minimize the error. The theory curve is based on knowledge of the instantaneous transmit signals, and an assumed dominance of the 3rd order mixing product. The true received PIM can be dependent on transmit and receive path effects, reflections from surrounding objects, near-field coupling of field components and PIM object orientation, and the "true" nature of the PIM generation as a property of the material itself. The measurement curve RxA therefore represents the culmination of all these effects, and the dotted curving showing how modest low-pass filtering of the measurement data can remove some of the noisier high-frequency components, showing a more favorable comparison to the modeled signal.

Figure 8:
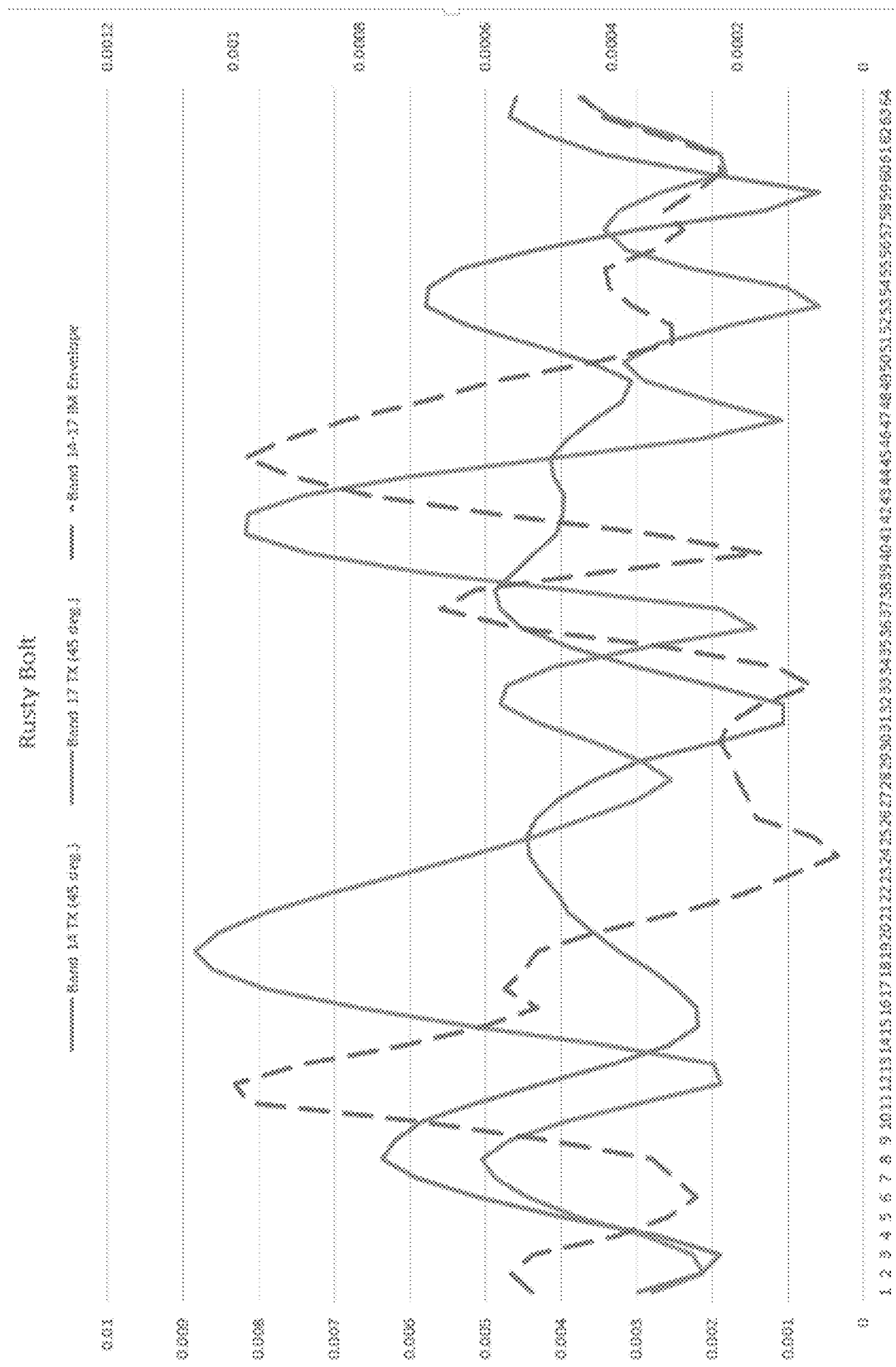
FIG. 8 illustrates an example graph for a passive intermodulation cancelation training, wherein a rusty bolt is the passive intermodulation source.

Alternatively, FIG. 8 depicts a rusty bolt as the passive intermodulation source, wherein a band 14 transmission and a band 17 transmission are compared to a band 14-17 intermodulation envelope. FIG. 8 depicts a similar process (as noted above) using a neural-network learning algorithm. The upper chart shows a sample taken using a rusted steel bolt. Here the band 14 transmission curve is developed using the fixed 3rd order model. The band 17 transmission below is the same data, though this time processed through a neural-network. Close tracking of the estimate can be seen in FIG. 8. especially with the time-averaged data of the actual measured response shown as the dotted line.

Figure 9:
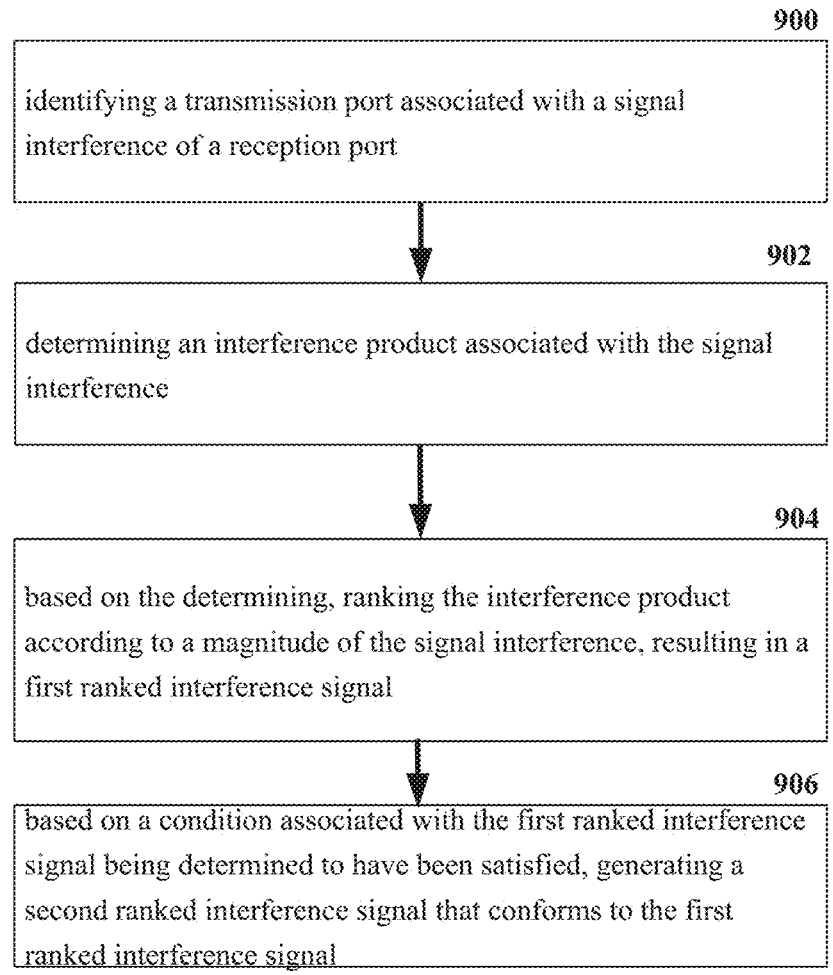
FIG. 9 illustrates an example schematic system block diagram for a method to perform passive intermodulation cancelation according to one or more embodiments.

Referring now to FIG. 9, illustrated is an example schematic system block diagram for a method to perform passive intermodulation cancelation according to one or more embodiments. At element 900, the method can comprise identifying a transmission port associated with a signal interference of a reception port (e.g., via the intermodulation detection component 208). At element 902, the method can comprise determining an interference product associated with the signal interference (e.g., via the analysis component 206). Based on the determining, the method can comprise ranking (e.g., via the ranking component 312) the interference product according to a magnitude of the signal interference, resulting in a first ranked interference signal at element 904. Additionally, based on a condition associated with the first ranked interference signal being determined to have been satisfied, the method can comprise generating (e.g., via the signal generation component 308), by the wireless network device, a second ranked interference signal that conforms to the first ranked interference signal at element 906.

Figure 10:
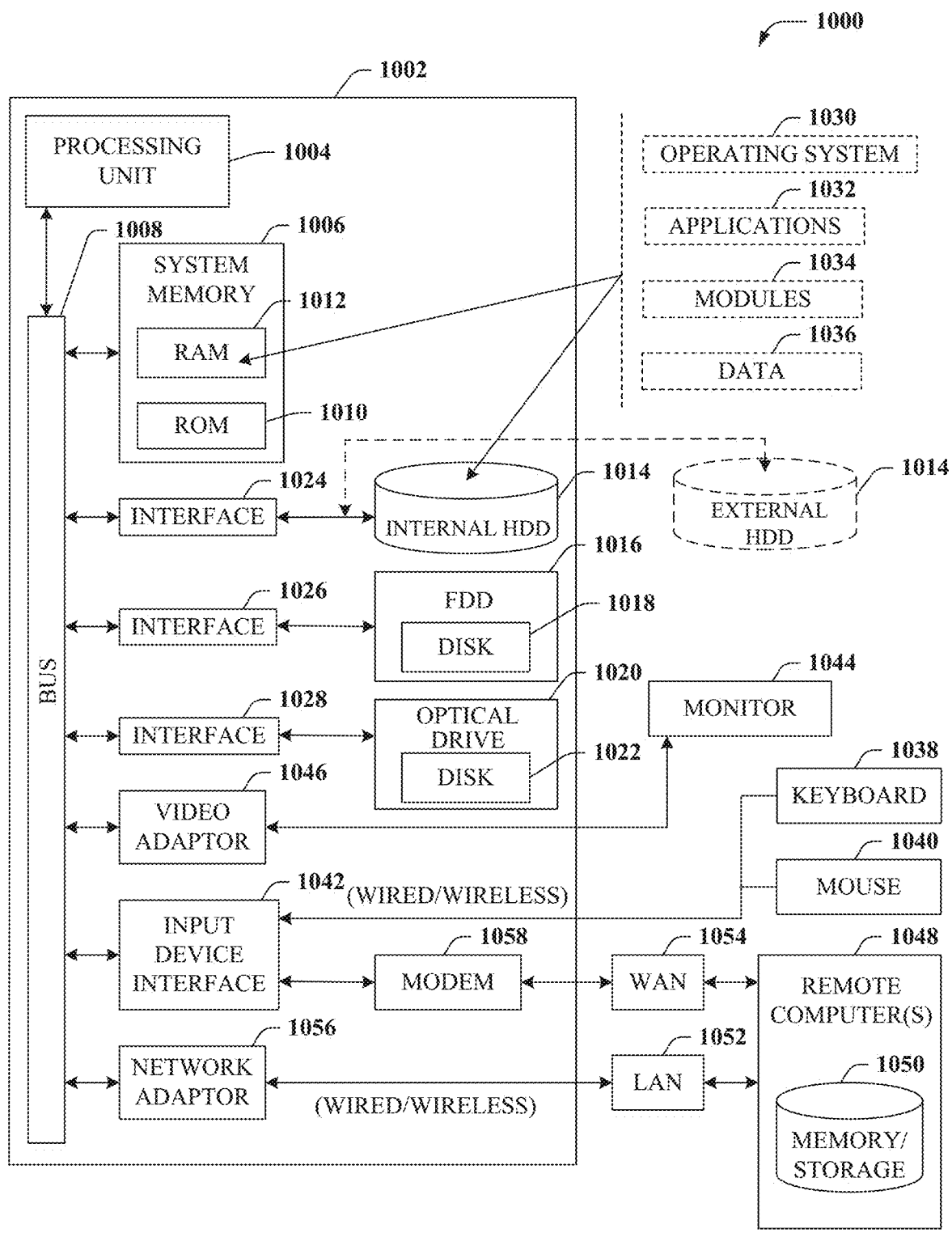
FIG. 10 illustrates an example schematic system block diagram of an example non-limiting embodiment of a computing environment in accordance with various aspects described herein.

Referring now to FIG. 10, illustrated is a block diagram of a computing environment in accordance with various aspects described herein. For example, in some embodiments, the computer can be or be included within the radio repeater system disclosed in any of the previous systems 100, 200, 300, and/or 400.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), which internal hard disk drive 1014 can also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) can include a microphone, an infrared (IR) remote control, a joystick, a game pad, a stylus pen, touch screen or the like. These and other input devices are often connected to the processing unit 1004 through an input device interface 1042 that can be coupled to the system bus 1008, but can be connected by other interfaces, such as a parallel port, an IEEE 1394 serial port, a game port, a universal serial bus (USB) port, an IR interface, etc.

A monitor 1044 or other type of display device can be also connected to the system bus 1008 via an interface, such as a video adapter 1046. In addition to the monitor 1044, a computer typically includes other peripheral output devices (not shown), such as speakers, printers, etc.

The computer 1002 can operate in a networked environment using logical connections via wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1052 through a wired and/or wireless communication network interface or adapter 1056. The adapter 1056 can facilitate wired or wireless communication to the LAN 1052, which can also include a wireless AP disposed thereon for communicating with the wireless adapter 1056.

When used in a WAN networking environment, the computer 1002 can include a modem 1058 or can be connected to a communications server on the WAN 1054 or has other means for establishing communications over the WAN 1054, such as by way of the Internet. The modem 1058, which can be internal or external and a wired or wireless device, can be connected to the system bus 1008 via the input device interface 1042. In a networked environment, program modules depicted relative to the computer 1002 or portions thereof, can be stored in the remote memory/storage device 1050. It will be appreciated that the network connections shown are example and other means of establishing a communications link between the computers can be used.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands, at an 11 Mbps (802.11a) or 54 Mbps (802.11b) data rate, for example or with products that contain both bands (dual band), so the networks can provide real-world performance similar to the basic 10 BaseT wired Ethernet networks used in many offices.

In an embodiment of the subject application, the computer 1002 can provide the environment and/or setting in which one or more of the passive intermodulation detection and cancelation systems disclosed in FIGS. 1-4 can be operated from. For instance, the virtual machines disclosed herein can be applications 1032 stored in hard drive 1014 and executed by processing unit 1004.

Figure 11:
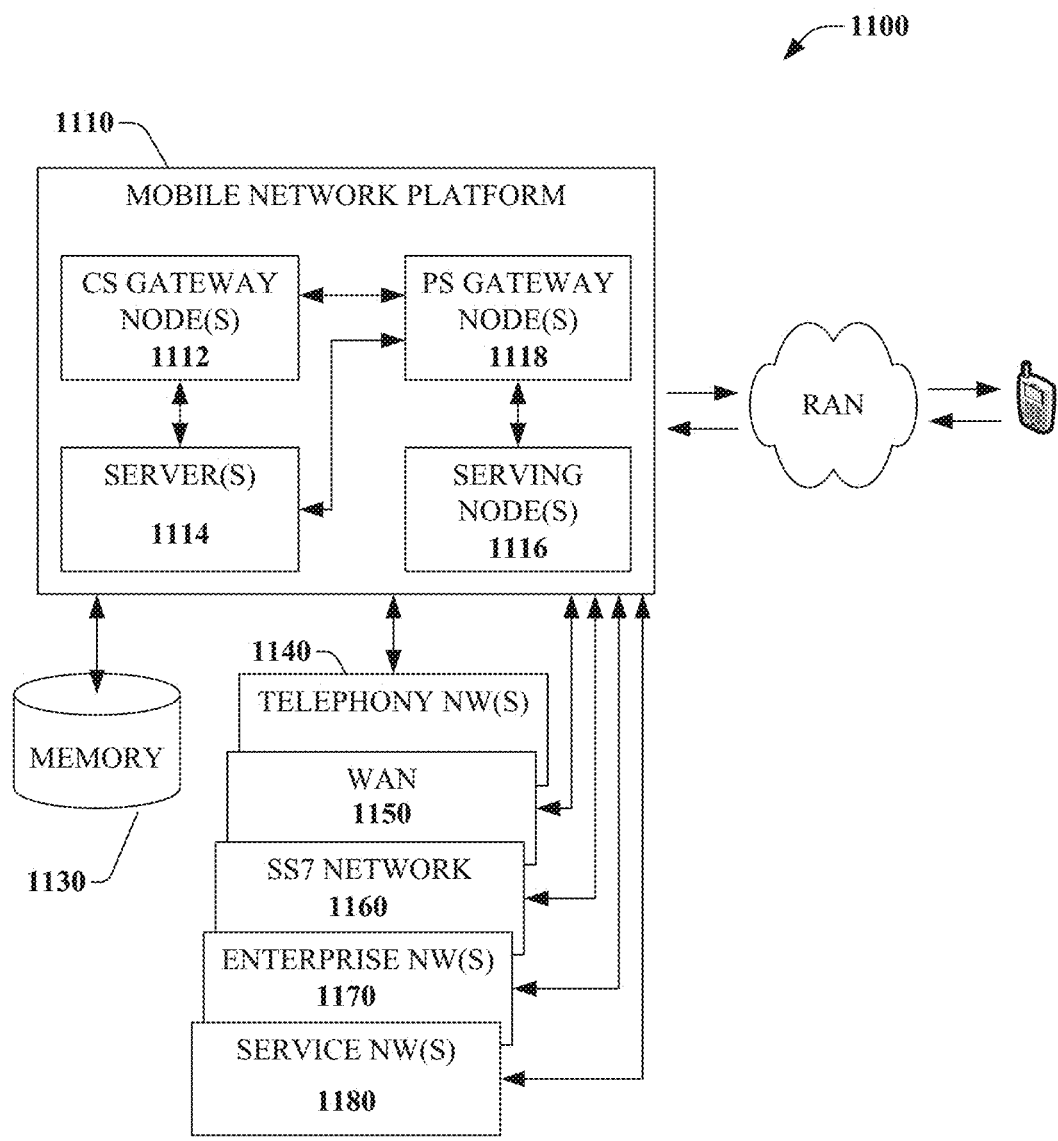
FIG. 11 illustrates an example block diagram of an example, non-limiting embodiment of a mobile network platform in accordance with various aspects described herein.

FIG. 11 illustrates an example embodiment 1100 of a mobile network platform 1110 that can implement and exploit one or more aspects of the disclosed subject matter described herein. Generally, wireless network platform 1110 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, wireless network platform 1110 can be included in telecommunications carrier networks, and can be considered carrier-side components as discussed elsewhere herein. Mobile network platform 1110 includes CS gateway node(s) 1112 which can interface CS traffic received from legacy networks like telephony network(s) 1140 (e.g., public switched telephone network (PSTN), or public land mobile network (PLMN)) or a signaling system #7 (SS7) network 1170. Circuit switched gateway node(s) 1112 can authorize and authenticate traffic (e.g., voice) arising from such networks. Additionally, CS gateway node(s) 1112 can access mobility, or roaming, data generated through SS7 network 1170; for instance, mobility data stored in a visited location register (VLR), which can reside in memory 1130. Moreover, CS gateway node(s) 1112 interfaces CS-based traffic and signaling and PS gateway node(s) 1118. As an example, in a 3GPP UMTS network, CS gateway node(s) 1112 can be realized at least in part in gateway GPRS support node(s) (GGSN). It should be appreciated that functionality and specific operation of CS gateway node(s) 1112, PS gateway node(s) 1118, and serving node(s) 1116, is provided and dictated by radio technology (ies) utilized by mobile network platform 1110 for telecommunication. Mobile network platform 1110 can also include the MMEs, HSS/PCRFs, SGWs, and PGWs disclosed herein.

In addition to receiving and processing CS-switched traffic and signaling, PS gateway node(s) 1118 can authorize and authenticate PS-based data sessions with served mobile devices. Data sessions can include traffic, or content(s), exchanged with networks external to the wireless network platform 1110, like wide area network(s) (WANs) 1150, enterprise network(s) 1170, and service network(s) 1180, which can be embodied in local area network(s) (LANs), can also be interfaced with mobile network platform 1110 through PS gateway node(s) 1118. It is to be noted that WANs 1150 and enterprise network(s) 1160 can embody, at least in part, a service network(s) like IP multimedia subsystem (IMS). Based on radio technology layer(s) available in technology resource(s) 1117, packet-switched gateway node(s) 1118 can generate packet data protocol contexts when a data session is established; other data structures that facilitate routing of packetized data also can be generated. To that end, in an aspect, PS gateway node(s) 1118 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1100, wireless network platform 1110 also includes serving node(s) 1116 that, based upon available radio technology layer(s) within technology resource(s) 1117, convey the various packetized flows of data streams received through PS gateway node(s) 1118. It is to be noted that for technology resource(s) 1117 that rely primarily on CS communication, server node(s) can deliver traffic without reliance on PS gateway node(s) 1118; for example, server node(s) can embody at least in part a mobile switching center. As an example, in a 3GPP UMTS network, serving node(s) 1116 can be embodied in serving GPRS support node(s) (SGSN).

For radio technologies that exploit packetized communication, server(s) 1114 in wireless network platform 1110 can execute numerous applications that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1110. Data streams (e.g., content(s) that are part of a voice call or data session) can be conveyed to PS gateway node(s) 1118 for authorization/authentication and initiation of a data session, and to serving node(s) 1116 for communication thereafter. In addition to application server, server(s) 1114 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1110 to ensure network's operation and data integrity in addition to authorization and authentication procedures that CS gateway node(s) 1112 and PS gateway node(s) 1118 can enact. Moreover, provisioning server(s) can provision services from external network(s) like networks operated by a disparate service provider; for instance, WAN 1150 or Global Positioning System (GPS) network(s) (not shown). Provisioning server(s) can also provision coverage through networks associated to wireless network platform 1110 (e.g., deployed and operated by the same service provider), such as femto-cell network(s) (not shown) that enhance wireless service coverage within indoor confined spaces and offload RAN resources in order to enhance subscriber service experience within a home or business environment by way of UE 1175.

It is to be noted that server(s) 1114 can include one or more processors configured to confer at least in part the functionality of macro network platform 1110. To that end, the one or more processor can execute code instructions stored in memory 1130, for example. It is should be appreciated that server(s) 1114 can include a content manager 1115, which operates in substantially the same manner as described hereinbefore.

In example embodiment 1100, memory 1130 can store information related to operation of wireless network platform 1110. Other operational information can include provisioning information of mobile devices served through wireless platform network 1110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1130 can also store information from at least one of telephony network(s) 1140, WAN 1150, enterprise network(s) 1160, or SS7 network 1170. In an aspect, memory 1130 can be, for example, accessed as part of a data store component or as a remotely connected memory store.

In order to provide a context for the various aspects of the disclosed subject matter, FIGS. 10 and 11, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules include routines, programs, components, data structures, etc. that perform particular tasks and/or implement particular abstract data types.

Furthermore, for future SDN (software defined networks) with NFV (network function virtualization), the cancelation can be in the form of a software module that can be implemented (or not if there is no PIM degradation) inside the virtualized RAN module. This can scale the approach to include PIM cancelation for PIM originating from multiple carrier interactions.

In the subject specification, terms such as "store," "storage," "data store," "data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory, by way of illustration, and not limitation, volatile memory (see below), non-volatile memory (see below), disk storage (see below), and memory storage (see below). Further, nonvolatile memory can be included in read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, including single-processor or multiprocessor computer systems, mini-computing devices, mainframe computers, as well as personal computers, hand-held computing devices (e.g., PDA, phone, watch, tablet computers, netbook computers, . . . ), microprocessor-based or programmable consumer or industrial electronics, field programmable gate array, graphics processor, or software defined radio reconfigurable processor and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

The embodiments described herein can employ artificial intelligence (AI) to facilitate automating one or more features described herein. The embodiments (e.g., in connection with passive intermodulation cancelation techniques) can employ various AI-based schemes for carrying out various embodiments thereof. Moreover, a classifier can be employed to determine a ranking or priority of the products as a function of the signals. A classifier is a function that maps an input attribute vector, $x=(x1, x2, x3, x4, \ldots, xn)$, to a confidence that the input belongs to a class, that is, $f(x)=confidence(class)$. Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches include, e.g., naïve Bayes, Bayesian networks, decision trees, neural networks, fuzzy logic models, and probabilistic classification models providing different patterns of independence can be employed to cancel signal interference. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to a predetermined criteria which signal product should have the highest severity based on the interference and/or the carrier itself, etc.

As used in this application, in some embodiments, the terms "component," "system" and the like are intended to refer to, or include, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," "subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method, comprising:
   identifying, by a network device, comprising a processor, of a wireless network, a transmission port associated with a signal interference of a reception port;
   determining, by the network device, an interference product associated with the signal interference;
   based on the determining, ranking, by the network device, the interference product according to a magnitude of the signal interference, resulting in a first ranked interference signal;
   based on a condition associated with the first ranked interference signal being determined to have been satisfied, generating, by the network device, a second ranked interference signal that conforms to the first ranked interference signal;
   in response to the ranking, generating, by the network device, a channel associated with the transmission port and the reception port to modify a transmission signal associated with the transmission port;
   based on the transmission signal, estimating, by the network device, an interference signal at the reception port, resulting in an estimated signal; and
   subtracting, by the network device, the estimated signal from the second ranked interference signal, resulting in an error signal.

2. The method of claim 1, wherein the signal interference is a first signal interference, and further comprising:
   based on the error signal, canceling, by the network device, a second signal interference associated with a second signal.

3. The method of claim 2, further comprising:
   routing, by the network device, the second signal to a canceler device associated with the reception port, to cancel a third signal interference.

4. The method of claim 3, further comprising:
   based on the condition associated with the first ranked interference signal being determined to have been satisfied, estimating, by the network device, the second ranked interference signal.

5. The method of claim 1, further comprising:

based on the error signal, canceling, by the network device, the signal interference associated with the reception port.

6. The method of claim 1, wherein the estimated signal is a first estimated signal, and further comprising:
utilizing, by the network device, the error signal to determine a second estimated signal.

7. The method of claim 6, further comprising:
based on the error signal and the second estimated signal, modifying, by the network device, a third estimated signal.

8. The method of claim 1, wherein the generating the second ranked interference signal comprises generating the second ranked interference signal in accordance with a limit on physical resource block utilization of the wireless network.

9. A system, comprising:
a processor; and
a memory that stores executable instructions that, when executed by the processor, facilitate performance of operations, comprising:
determining a signal interference associated with a signal received by a receiver device;
determining an interference product as a function of the signal interference;
based on the interference product, generating rank data representative of a rank of the signal interference, and applying the rank data to the signal interference to generate a ranked interference signal;
in response to the applying, generating a channel associated with a transmission device and the receiver device to modify a transmission signal associated with the transmission device;
based on the transmission signal, estimating an interference signal at the receiver device, resulting in an estimated signal; and
subtracting the estimated signal from the ranked interference signal, resulting in an error signal.

10. The system of claim 9, wherein the signal is a first signal, wherein the signal interference is a first signal interference, wherein the estimated signal is a first estimated signal, and wherein the operations further comprise:
estimating a second signal interference, associated with a second signal, resulting in a second estimated signal.

11. The system of claim 10, wherein the error signal is a first error signal, and wherein the operations further comprise:
subtracting a first value associated with the second estimated signal from a second value associated with the ranked interference signal, resulting in a second error signal.

12. The system of claim 11, wherein the operations further comprise:
based on the second error signal, canceling the second signal interference associated with the second signal.

13. The system of claim 12, wherein the operations further comprise:
based on the second error signal and the second estimated signal, modifying a third estimated signal.

14. The system of claim 10, wherein the operations further comprise:
routing the second signal to a canceler device associated with the receiver device, to cancel a third signal interference.

15. A non-statutory machine-readable storage medium, comprising executable instructions that, when executed by a processor, facilitate performance of operations, comprising:
receiving first signal data related to a transmission signal from a transmission port device to a reception port device, wherein a first signal interference associated with the transmission signal is determined to be present at the reception port device;
based on determining an interference product associated with the first signal interference, ranking the interference product, resulting in rank data;
based on the rank data, generating a ranked interference signal;
generating a second signal interference and a channel associated with the transmission port device and the reception port device to modify the transmission signal associated with the transmission port device;
based on the transmission signal, estimating an interference signal at the reception port device, resulting in an estimated signal; and
subtracting the estimated signal from the ranked interference signal, resulting in an error signal.

16. The machine-readable storage medium of claim 15, wherein the transmission signal is a first transmission signal, and wherein the operations further comprise:
generating the channel associated with the transmission port device and the reception port device to modify a second transmission signal from the transmission port device to the reception port device.

17. The machine-readable storage medium of claim 16, wherein the operations further comprise:
based on the second transmission signal, estimating the second signal interference experienced by the reception port device do to the second transmission signal.

18. The machine-readable storage medium of claim 17, wherein the operations further comprise:
reducing a first value associated with the ranked interference signal by a second value associated with the second signal interference, resulting in a third value associated with the error signal.

19. The machine-readable storage medium of claim 18, wherein the operations further comprise:
utilizing the third value to determine a third signal interference of a third signal.

20. The machine-readable storage medium of claim 15, wherein the ranking the interference product comprises ranking the interference product in accordance with a constraint on utilization of a physical resource block of a wireless network.

* * * * *

UNITED STATES PATENT AND TRADEMARK OFFICE
CERTIFICATE OF CORRECTION

PATENT NO. : 10,601,456 B2
APPLICATION NO. : 16/237922
DATED : March 24, 2020
INVENTOR(S) : Ernest Tsui, Paul Maxwell and Weihua Ye Page 1 of 1

It is certified that error appears in the above-identified patent and that said Letters Patent is hereby corrected as shown below:

In the Claims

In Column 24, Line 8, Claim 15, delete "non-statutory" and insert --non-transitory--, therefor.

In Column 24, Line 30, Claim 16, delete "The machine-readable" and insert --The non-transitory machine-readable--, therefor.

In Column 24, Line 37, Claim 17, delete "The machine-readable" and insert --The non-transitory machine-readable--, therefor.

In Column 24, Line 42, Claim 18, delete "The machine-readable" and insert --The non-transitory machine-readable--, therefor.

In Column 24, Line 48, Claim 19, delete "The machine-readable" and insert --The non-transitory machine-readable--, therefor.

In Column 24, Line 52, Claim 20, delete "The machine-readable" and insert --The non-transitory machine-readable--, therefor.

Signed and Sealed this
Tenth Day of November, 2020

Andrei Iancu
*Director of the United States Patent and Trademark Office*